United States Patent
Abraham et al.

(10) Patent No.: US 8,738,290 B2
(45) Date of Patent: May 27, 2014

(54) METHOD AND APPARATUS FOR MANAGING NETWORK ELEMENTS IN A SATELLITE NAVIGATION DATA DISTRIBUTION SYSTEM

(75) Inventors: Charles Abraham, Los Gatos, CA (US); Steven Malkos, San Jose, CA (US); Sergei Podshivalov, San Jose, CA (US)

(73) Assignee: Global Locate, Inc., San Jose, CA (US)

( * ) Notice: Subject to any disclaimer, the term of this patent is extended or adjusted under 35 U.S.C. 154(b) by 661 days.

(21) Appl. No.: 12/760,226

(22) Filed: Apr. 14, 2010

(65) Prior Publication Data
US 2011/0169695 A1 Jul. 14, 2011

Related U.S. Application Data

(63) Continuation of application No. 11/077,380, filed on Mar. 10, 2005, now abandoned, which is a continuation-in-part of application No. 10/719,890, filed on Nov. 21, 2003, now Pat. No. 7,945,387.

(51) Int. Cl.
*G06F 19/00* (2011.01)

(52) U.S. Cl.
USPC ...... 701/412; 701/469; 342/357.66; 370/338; 455/456.6; 709/224; 709/203

(58) Field of Classification Search
USPC .................. 701/207, 213, 214, 412, 505, 469; 717/136, 143, 110; 702/190, 181, 182; 342/357.09, 357.02, 357.66; 370/338; 455/456.6; 709/224, 203
See application file for complete search history.

(56) References Cited

U.S. PATENT DOCUMENTS

| | | | |
|---|---|---|---|
| 4,445,118 A | 4/1984 | Taylor et al. | |
| 5,899,957 A | 5/1999 | Loomis | |
| 6,067,484 A * | 5/2000 | Rowson et al. | 701/16 |
| 6,091,959 A | 7/2000 | Souissi et al. | |
| 6,185,427 B1 | 2/2001 | Krasner et al. | |

(Continued)

FOREIGN PATENT DOCUMENTS

| | | |
|---|---|---|
| CN | 1307683 A | 8/2001 |
| CN | 1465015 A | 12/2003 |

OTHER PUBLICATIONS

European Search Report directed to related EP Application No. 06 737 669.9, European Patent Office, Rijswijk, Netherlands, mailed Dec. 22, 2011; 4 pages.

(Continued)

Primary Examiner — Ronnie Mancho
(74) Attorney, Agent, or Firm — Sterne, Kessler, Goldstein & Fox P.L.L.C.

(57) ABSTRACT

Method and apparatus for managing a network element in a satellite navigation data distribution system is described. In one example, a network element includes a processor for processing satellite navigation data. For example, a network element may be a reference station, a hub, or a server in the satellite navigation data distribution system. The network element includes a memory for maintaining status variables associated with the processing of the satellite navigation data. The status variables may relate to the integrity of the satellite navigation data. The network element further includes a management agent for monitoring states of the status variables and communicating with a network management system to exchange information related to the states of the status variables. In one example, the management agent is configured to communicate using a simple network management protocol (SNMP).

18 Claims, 9 Drawing Sheets

(56) References Cited

U.S. PATENT DOCUMENTS

| | | | |
|---|---|---|---|
| 6,215,441 B1* | 4/2001 | Moeglein et al. | 342/357.25 |
| 6,411,892 B1 | 6/2002 | van Diggelen | |
| 6,560,534 B2 | 5/2003 | Abraham et al. | |
| 6,633,835 B1* | 10/2003 | Moran et al. | 702/190 |
| 6,725,159 B2 | 4/2004 | Krasner | |
| 6,775,802 B2* | 8/2004 | Gaal | 714/758 |
| 6,799,116 B2 | 9/2004 | Robbins | |
| 6,813,560 B2 | 11/2004 | van Diggelen et al. | |
| 7,945,387 B2 | 5/2011 | Podshivalov et al. | |
| 2001/0053174 A1* | 12/2001 | Fleming et al. | 375/130 |
| 2002/0032526 A1 | 3/2002 | van Diggelen | |
| 2002/0049536 A1* | 4/2002 | Gaal | 701/213 |
| 2002/0072855 A1 | 6/2002 | Fuchs et al. | |
| 2002/0105459 A1* | 8/2002 | Diggelen | 342/357.09 |
| 2002/0198657 A1 | 12/2002 | Robbins | |
| 2003/0011511 A1* | 1/2003 | King et al. | 342/357.02 |
| 2003/0014188 A1 | 1/2003 | Abraham et al. | |
| 2003/0107513 A1 | 6/2003 | Abraham | |
| 2003/0212821 A1 | 11/2003 | Gillies et al. | |
| 2003/0223422 A1 | 12/2003 | Igarashi et al. | |
| 2005/0114022 A1 | 5/2005 | Podshivalov et al. | |
| 2005/0234643 A1 | 10/2005 | Abraham et al. | |
| 2005/0278708 A1* | 12/2005 | Zhao et al. | 717/136 |

OTHER PUBLICATIONS

Van Diggelen, Frank, "Global Locate Indoor GPS Chipset & Service", ION GPS 2001, Sep. 11-14, 2001, Salt Lake City, UT, USA (Online), Sep. 11, 2001, XP002358532, retrieved from http://www.ion.org, retrieved on Dec. 9, 2005; pp. 1515-1521.

International Search Report directed to related International Patent Application No. PCT/US04/39367, mailed Dec. 23, 2005; 4 pages.

Written Opinion of International Search Authority directed to related International Patent Application No. PCT/US04/39367, mailed Dec. 23, 2005; 5 pages.

International Preliminary Report on Patentability of the International Search Authority directed to related International Patent Application No. PCT/US04/39367, mailed Jun. 1, 2006.

International Search Report directed to related International Patent Application No. PCT/US2006/08512, mailed Aug. 25, 2008; 2 pages.

Written Opinion of the International Search Authority directed to related International Patent Application No. PCT/US2006/08512, mailed Aug. 25, 2008; 9 pages.

Communication pursuant to Article 94(3) EPC of the European Patent Office directed to related European Patent Application No. 04822150.1-1248, dated Jan. 22, 2009.

* cited by examiner

METHOD AND APPARATUS FOR MANAGING NETWORK ELEMENTS IN A SATELLITE NAVIGATION DATA DISTRIBUTION SYSTEM

CROSS-REFERENCE TO RELATED APPLICATIONS

This application is a continuation-in-part of co-pending U.S. patent application Ser. No. 10/719,890, filed Nov. 21, 2003, which is herein incorporated by reference.

BACKGROUND OF THE INVENTION

1. Field of the Invention

The present invention generally relates to satellite position location systems and, more particularly, to a method and apparatus for managing network elements in a satellite navigation data distribution system.

2. Description of the Related Art

A satellite signal receiver for the Global Positioning System (GPS) uses measurements from several satellites to compute a position. The process of acquiring the GPS radio signal is enhanced in speed and sensitivity if the GPS receiver has prior access to a model of the satellite orbit and clock. This model is broadcast by the GPS satellites and is known as the satellite navigation message. Once the GPS radio signal has been acquired, the process of computing position requires the use of information contained within the satellite navigation message.

The GPS satellite navigation message is transmitted in 1500-bit frames at 50 bits per second, as defined by ICD-GPS-200C. Thus, each frame is transmitted in 30 seconds. The 1500-bit frame of each broadcast includes five sub-frames of 300 bits length. The first three sub-frames (i.e., the first 900 bits) include the ephemeris information associated with the particular broadcasting satellite. The ephemeris information contains precise satellite orbit and time model information for a particular satellite. The first three sub-frames are identically repeated in each 1500-bit frame for a particular duration. The broadcast ephemeris information is typically valid for two to four hours into the future (from the time of broadcast) and is periodically updated by a satellite control station. The fourth and fifth sub-frames contain part of a satellite almanac, which includes coarse ephemeris and time model information for the entire satellite constellation. The contents of the fourth and fifth sub-frames change until the entire almanac is transmitted. The repetition period of the fourth and fifth sub-frames is 12.5 minutes (i.e., the entire satellite almanac is contained in 15,000 bits).

It is always slow (no faster than 18 seconds), frequently difficult, and sometimes impossible (in environments with very low signal strengths), for a GPS receiver to download ephemeris information from a satellite. For these reasons, it has long been known that it is advantageous to send the ephemeris to a GPS receiver by some other means in lieu of awaiting the transmission from the satellite. U.S. Pat. No. 4,445,118, issued Apr. 24, 1984, describes a technique that collects ephemeris information at a GPS reference station, and transmits aiding data to the remote GPS receiver via a wireless transmission. This technique of providing aiding data to a GPS receiver has become known as "Assisted-GPS".

Presently, A-GPS reference stations receive ephemeris data for in-view satellites and store the entire ephemeris model (e.g., 900 bits) as a data file for distribution. The data file containing the ephemeris is transmitted to the remote receiver at some time after the initial collection of the data (e.g., minutes later). This latency between collection and distribution of the ephemeris data may deleteriously affect operation of the remote receiver. For example, the ephemeris data in use by the remote receiver may become invalid due to an unhealthy satellite. The remote receiver, however, will continue to use the invalid ephemeris data for several minutes before receiving updated ephemeris data from the server.

Therefore, there exists a need in the art for a method and apparatus that distributes satellite navigation data to a remote receiver with decreased latency. In addition, there exists a need in the art for a method and apparatus that monitors the integrity of the collected satellite navigation data, as well as the integrity of the network elements distributing such satellite navigation data.

SUMMARY OF THE INVENTION

The disadvantages associated with the prior art are overcome by a method and apparatus for distributing satellite navigation data. In one embodiment, satellite signals are processed at each of a plurality of reference stations to receive a respective plurality of satellite navigation data streams. Packets are formed in response to said plurality of satellite navigation data streams to generate a plurality of packetized satellite navigation data streams. The packetized satellite navigation data streams are sent to a processing system. The processing system removes duplicate packets within said plurality of packetized satellite navigation data streams to generate a combined packet stream. The combined packet stream is then sent into a communication network.

Another aspect of the invention relates to a method and apparatus for managing a network element in a satellite navigation data distribution system. In one embodiment, a network element includes a processor for processing satellite navigation data. For example, a network element may be a reference station, a hub, or a server in the satellite navigation data distribution system. The network element includes a memory for maintaining status variables associated with the processing of the satellite navigation data. The status variables may relate to the integrity of the satellite navigation data. The network element further includes a management agent for monitoring states of the status variables and communicating with a network management system to exchange information related to the states of the status variables. In one embodiment, the management agent is configured to communicate using a simple network management protocol (SNMP).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

Figure 1:
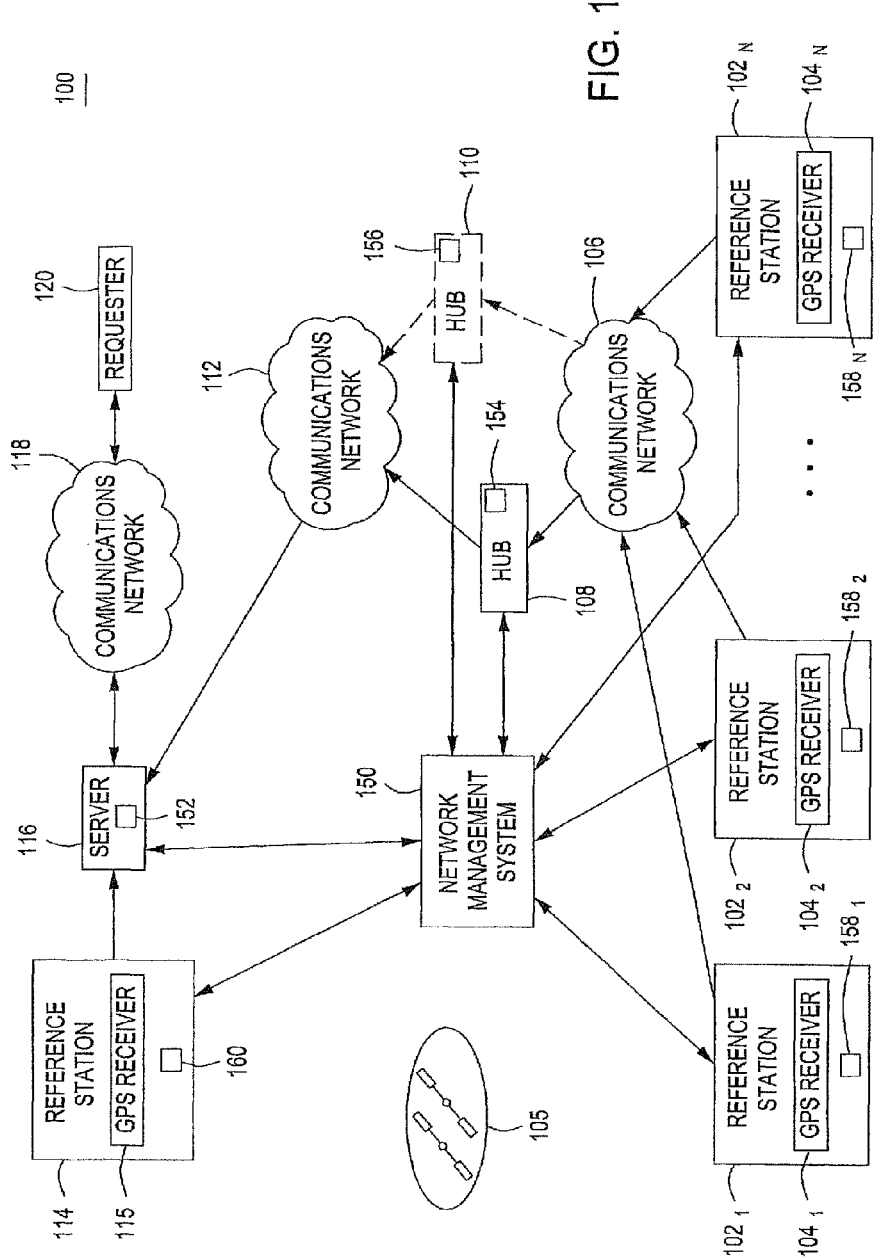
FIG. 1 is a block diagram depicting an exemplary embodiment of a satellite navigation data distribution system.

FIG. 1 is a block diagram depicting an exemplary embodiment of a satellite navigation data distribution system 100. The system 100 comprises a plurality of reference stations $102_1$ through $102_N$ (collectively referred to as reference stations 102), a hub 108, and a server 116. The reference stations 102 receive satellite navigation data from a plurality of satellites 105. The hub 108 collects the satellite navigation data from the reference stations 102 and provides the satellite navigation data to the server 116. The server 116 processes the satellite navigation data to decode the various parameters defined therein. The server 116 may then transmit information extracted from the satellite navigation data to a requester 120.

More specifically, each of the reference stations $102_1$ through $102_N$ includes a respective one of GPS receivers $104_1$ through $104_N$ (collectively referred to as satellite signal receivers 104) for receiving signals from satellites of the plurality of satellites 105 that are in-view. Each of the GPS receivers 104 decodes the received satellite signals to obtain satellite navigation data associated with the in-view satellites. The satellite navigation data comprises satellite navigation messages that are formatted into frames and sub-frames, as described above. The GPS receivers 104 are capable of streaming raw satellite navigation messages in real time. For example, certain NovAtel GPS receivers have this capability.

The reference stations 102 format the satellite navigation data streams produced by the GPS receivers 104 for transmission over the communications network 106 to the hub 108. In one embodiment, the reference stations 102 process the data streams to form packet streams comprising internet protocol (IP) packets, which may be transmitted over the communication link 106 using the uniform datagram protocol (UDP). The hub 108 processes the formatted data streams from the reference stations 102 ("reference station data streams") to remove redundant information. The hub 108 produces a formatted data stream comprising the unique information from the reference station data streams satellite navigation data from the reference stations 102 ("hub data stream"). The hub 108 transmits the hub data stream to the server 116 using a communication network 112. In one embodiment of the invention, one or more additional hubs ("hub(s) 110") are used to provide redundancy. The hub(s) 110 operate in the same manner as the hub 108. Each of the communication networks 106 and 112 may comprise any type of network known in the art, such frame relay, asynchronous transfer mode (ATM) networks, and the like. Although the communication networks 106 and 112 have been shown as separate networks, those skilled in the art will appreciate that networks 106 and 112 may comprise a single network.

In one embodiment, another reference station 114 may be disposed in proximity to the server 116. The reference station 114 includes a GPS receiver 115 similar to the GPS receivers 104, and provides a formatted data stream similar to those provided by the reference stations 102 ("co-located reference station data stream"). The server 116 processes the hub data stream(s) and the co-located reference station data stream, if available, to extract various parameters therefrom. For example, the server 116 may extract one or more of ephemeris data, almanac data, ionosphere data, universal time (UTC) offset data, satellite health data, as well as the raw data bits comprising the satellite navigation messages. Similar to the hubs 108 and 110, the server 116 may first process the hub data stream(s) and the co-located reference station data streams to remove redundant information. The extracted information may be provided to the requester 120 using a communication network 118. The communication network 118 may comprise a wireless communication network or other type of communication network, such as the Internet.

Figure 2:
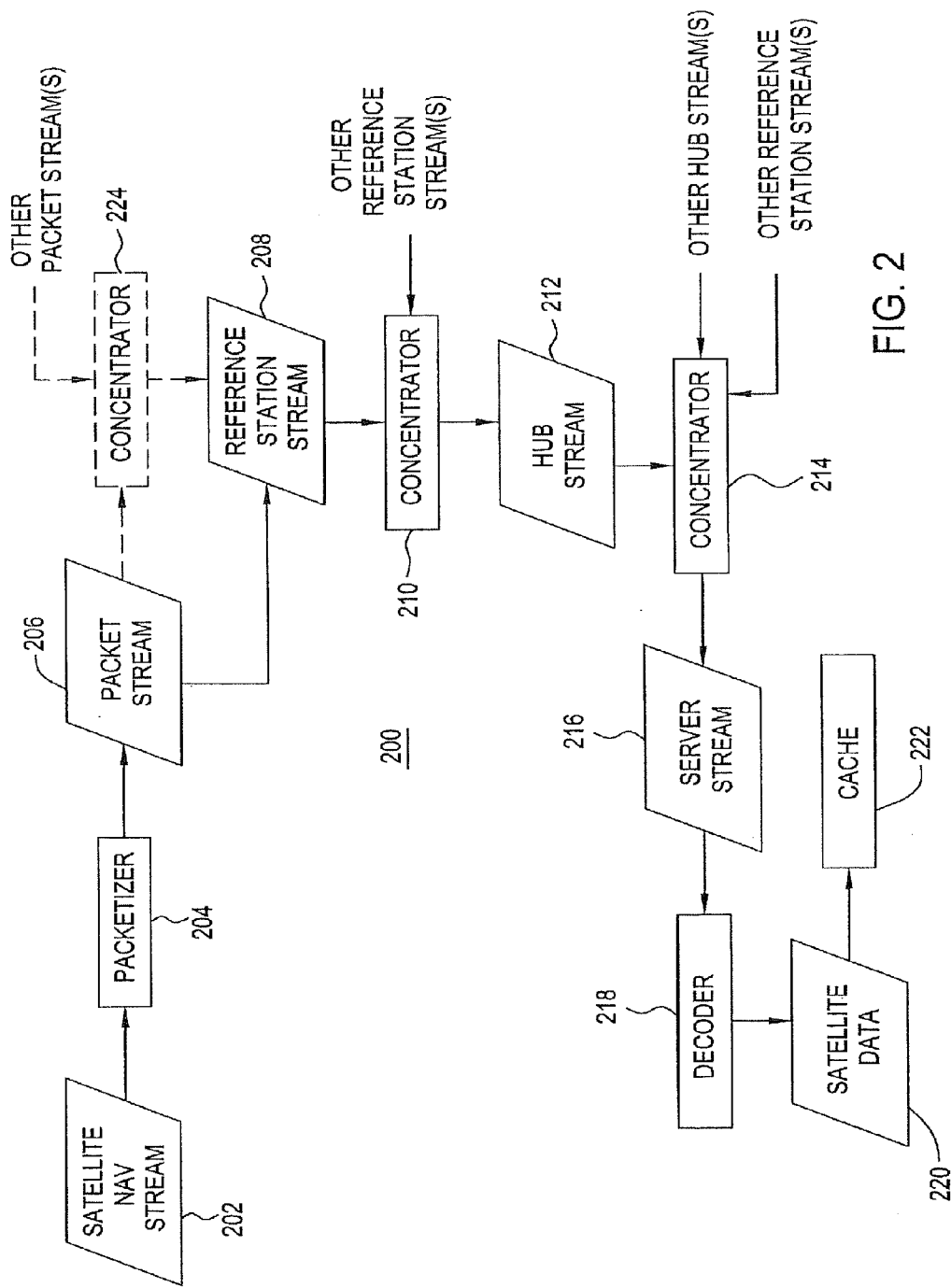
FIG. 2 is a data flow diagram depicting an exemplary embodiment of a process for distributing satellite navigation data from a reference station to a server.

FIG. 2 is a data flow diagram depicting an exemplary embodiment of a process 200 for distributing satellite navigation data from a reference station to a server. The process 200 begins with a satellite navigation data stream 202. The satellite navigation data stream 202 comprises sub-frames of satellite navigation messages broadcast by in-view satellites. The satellite navigation data stream 202 is provided as input to a packetizer 204. The packetizer 204 formats the satellite navigation data stream 202 into a packet stream 206. In one embodiment of the invention, each packet in the packet stream 206 includes a sub-frame of the satellite navigation data stream 202. In addition, each packet in the packet stream 206 includes a header for identifying the sub-frame carried therein. For example, the header may include a satellite identifier and a time-of-week (TOW) value that uniquely identifies the associated sub-frame. The packet stream 206 may be directly output as a reference station data stream 208.

The reference station data stream 208 is provided as input to a concentrator 210. The concentrator 210 also receives reference station data streams from other reference stations. The concentrator 210 processes the reference station data streams to remove packets carrying redundant information. For example, two of the reference stations may be positioned on the surface of the Earth so as to receive the satellite navigation message from the same satellite. The reference station data streams corresponding to these two reference stations will include packets that define identical sub-frames. The redundant sub-frame is not necessary and may be removed. The concentrator 210 provides a hub data stream 212 as output. The hub data stream 212 comprises a packet stream having unique information from the reference stations. For example, the hub data stream 212 may comprise a stream of packets carrying unique sub-frames.

The hub data stream 212 is provided as input to a concentrator 214. The concentrator 214 may also receive additional hub data stream(s), as well as an additional reference station data stream from a reference station co-located with the server. The concentrator 214 operates in a similar manner to the concentrator 210 to generate a server data stream 216. The server data stream 216 comprises a packet stream having unique information from the hubs and the co-located reference station. The server data stream 216 is provided as input to a decoder 218. The decoder 218 processes the server data stream 216 to extract satellite data 220. The satellite data 220 comprises one or more of ephemeris, almanac, ionosphere data, UTC offset, satellite health status, and raw data bits. The satellite data 220 is stored within a cache 222.

In one embodiment of the invention, a reference station may receive a reference station data stream from another reference station. Thus, the packet stream 206 within the reference station may be provided as input to an optional concentrator 224. The concentrator 224 operations in a similar manner to the concentrators 210 and 214 to remove redundant information and provide a unique reference station data stream 208 to the hub.

Figure 3:
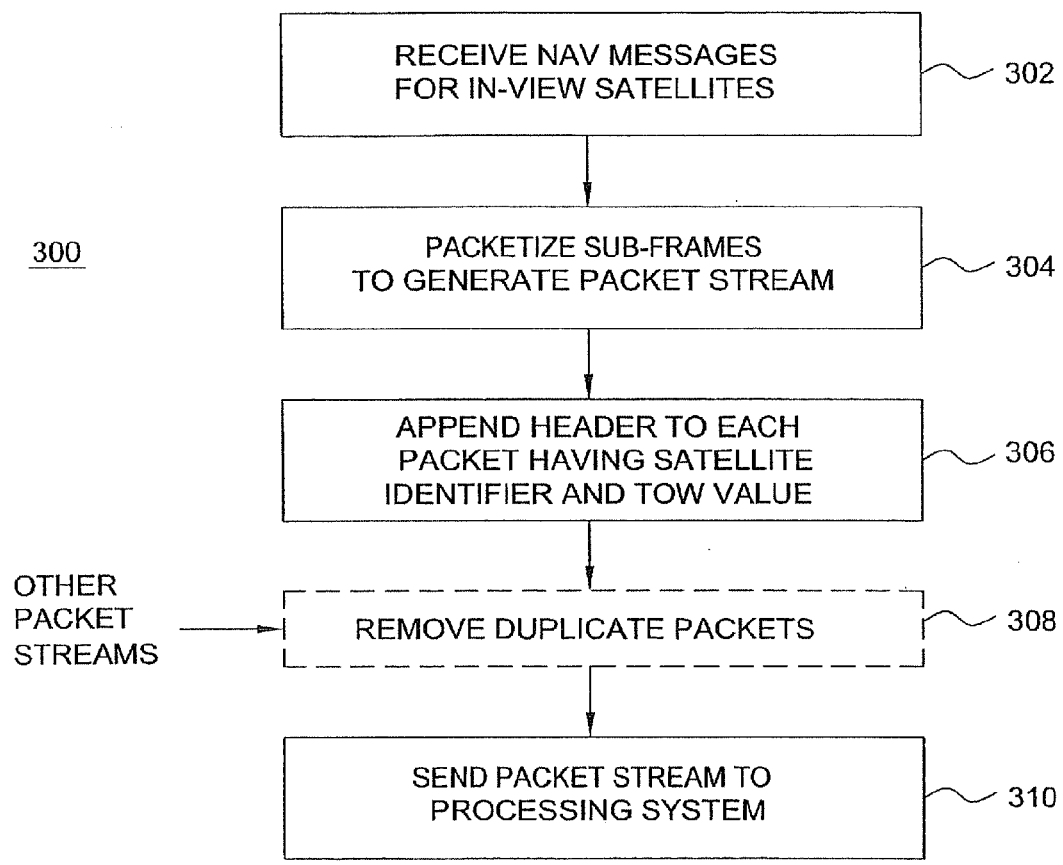
FIG. 3 is a flow diagram depicting an exemplary embodiment of a process for decoding satellite signals to recover satellite navigation data within a reference station.

FIG. 3 is a flow diagram depicting an exemplary embodiment of a process 300 for decoding satellite signals to recover satellite navigation data within a reference station. The process 300 begins at step 302, where satellite navigation messages are received for a plurality of in-view satellites. At step 304, the sub-frames of the satellite navigation messages are packetized to generate a packet stream (e.g., a stream of IP packets). At step 306, a header is added to each packet within the packet stream having a satellite identifier and a TOW value associated with a respective sub-frame. At optional step 308, the packet stream is merged with packet stream(s) from other reference stations and packets carrying redundant sub-frames are removed (e.g., packets having a header with the same satellite identifier and same TOW value). At step 310, the packet stream is transmitted to a hub. For example, the packet stream may be transmitted using UDP.

Figure 4:
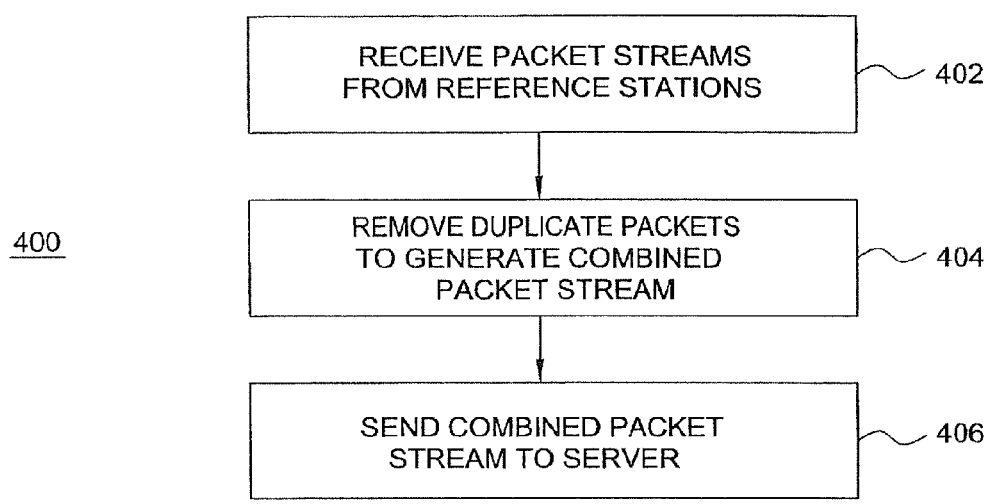
FIG. 4 is a flow diagram depicting an exemplary embodiment of a process for concentrating satellite navigation data within a hub.

FIG. 4 is a flow diagram depicting an exemplary embodiment of a process 400 for concentrating satellite navigation data within a hub. The process 400 begins at step 402, where packet streams are received from a plurality of reference stations. At step 404, packets of the packet streams are analyzed to remove those packets carrying redundant information and merged to produce a hub packet stream. For example, the headers of the packets may be analyzed for identify those headers having the same satellite identifier and the same TOW value. At step 406, the hub packet stream is transmitted to a server. For example, the hub packet stream may be transmitted using UDP.

Figure 5:
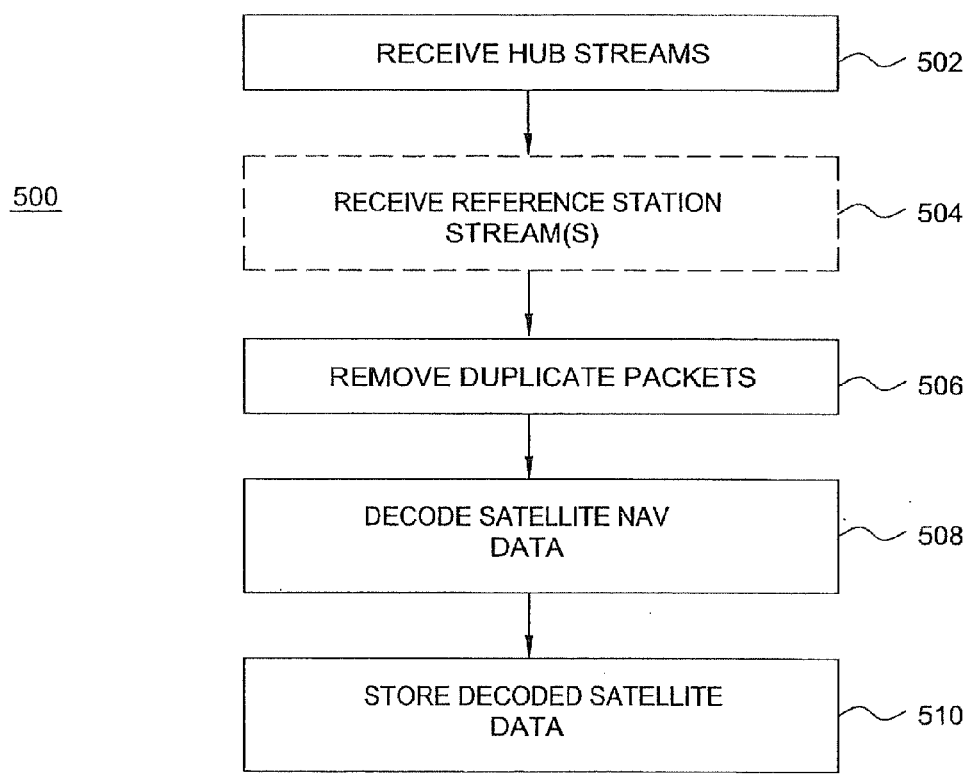
FIG. 5 is a flow diagram depicting an exemplary embodiment of a process for decoding satellite navigation data at a server.

FIG. 5 is a flow diagram depicting an exemplary embodiment of a process 500 for decoding satellite navigation data at a server. The process 500 begins at step 502, where one or more hub data stream(s) are received from one or more hubs. At optional step 504, a reference station data stream is received from a reference station co-located with the server. At step 506, packets of the hub data stream(s) and the optional reference station data are merged to produce a server data stream and packets carrying redundant sub-frames are removed (e.g., packets having a header with the same satellite identifier and same TOW value). At step 508, the satellite navigation data carried by the server data stream is decoded to produce satellite data. At step 510, the satellite data is stored within the server for transmission to a requester.

Figure 6:
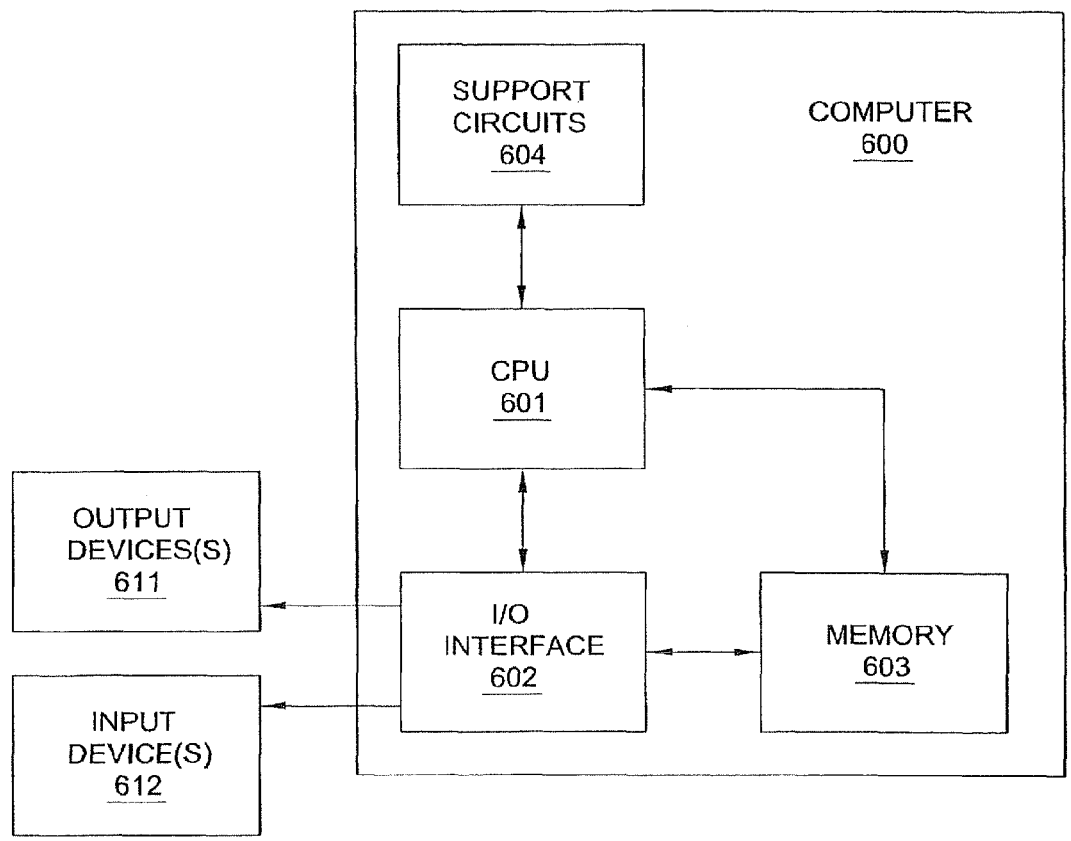
FIG. 6 is a block diagram depicting an exemplary embodiment of a computer for implementing the processes and methods described herein.

FIG. 6 is a block diagram depicting an exemplary embodiment of a computer 600 suitable for implementing processes and methods described above. The computer 600 includes a central processing unit (CPU) 601, a memory 603, various support circuits 604, and an I/O interface 602. The CPU 601 may be any type of microprocessor known in the art. The support circuits 604 for CPU 602 include conventional cache, power supplies, clock circuits, data registers, I/O interfaces, and the like. The I/O interface 602 may be directly coupled to the memory 603 or coupled through the CPU 601. The I/O interface 602 may be coupled to various input devices 612 and output devices 611, such as a conventional keyboard, mouse, printer, display, and the like.

The memory 603 may store all or portions of one or more programs and/or data to implement the processes and methods described above. Although the invention is disclosed as being implemented as a computer executing a software program, those skilled in the art will appreciate that the invention may be implemented in hardware, software, or a combination of hardware and software. Such implementations may include a number of processors independently executing various programs and dedicated hardware, such as application specific integrated circuits (ASICs).

Figure 7:
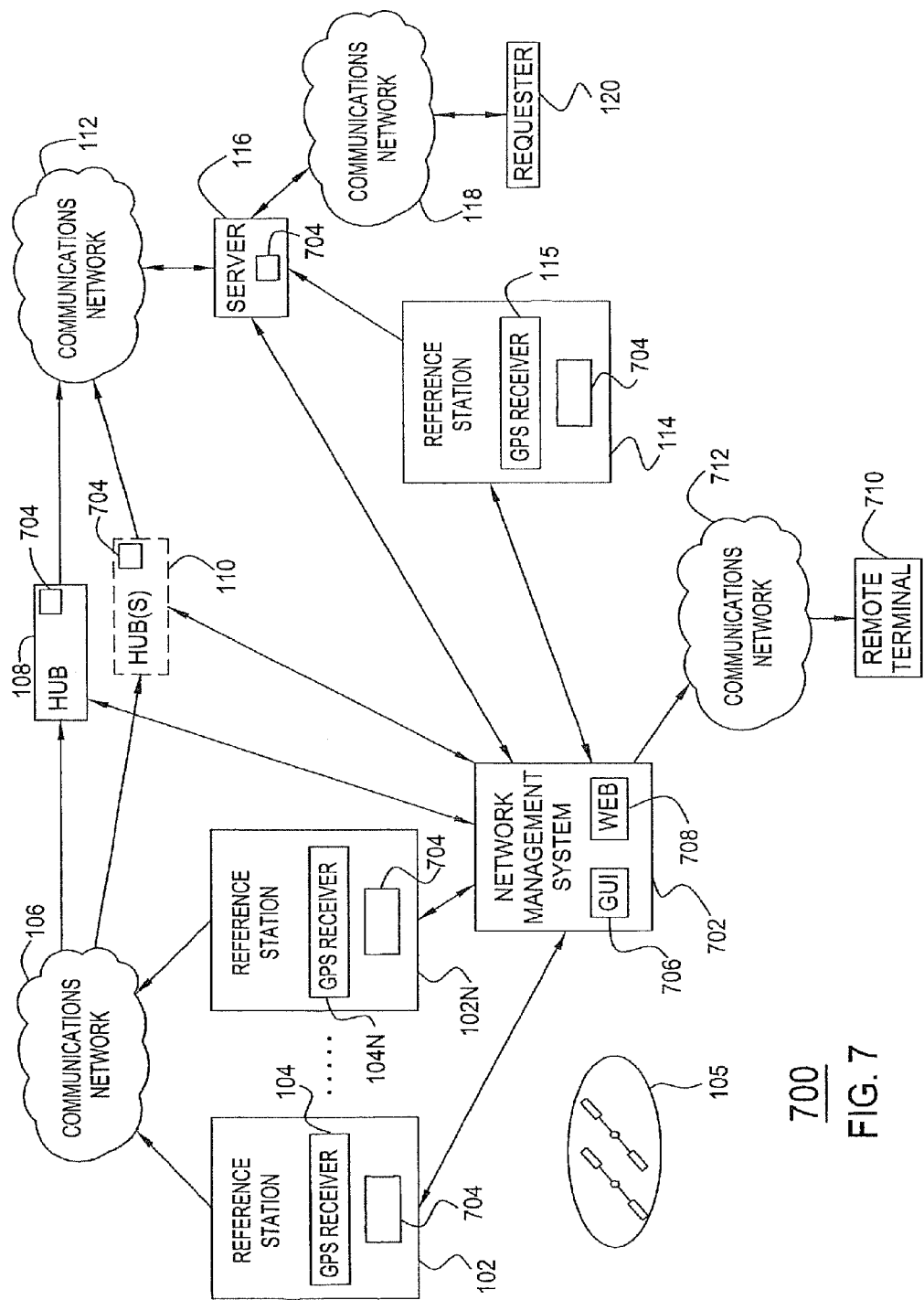
FIG. 7 is a block diagram depicting another exemplary embodiment of a satellite navigation data distribution system constructed in accordance with the invention.

FIG. 7 is a block diagram depicting another exemplary embodiment of a satellite navigation data distribution system 700 constructed in accordance with the invention. Elements in FIG. 7 that are the same or similar to elements in FIG. 1 are designated with identical reference numerals and are described in detail above. In the present embodiment, the system 700 further comprises a network management system 702 in communication with the reference stations 102, the hubs 108 and 110, the server 116, and the reference station 114. The reference stations 102, the hubs 108 and 110, the server 116, and the reference station 114 are generally referred to as "network elements." Each of the reference stations 102, the hubs 108 and 110, the server 116, and the reference station 114 includes a management agent 704. The network management system 702 includes an interface to a human network manager. For example, the network management system 702 may include a graphical user interface (GUI) 706 and/or an Internet or "web" interface 708 through which a network manager may manage the network elements in the system 700. Each management agent 704 provides an interface between the network management system 702 and its respective network element.

As described above, in operation, each of the network elements generally processes satellite navigation data. For example, each of the reference stations 102 obtains satellite navigation data and distributes the collected satellite navigation data to the hubs 108 and 110. Each of the hubs 108 and 110 concentrates the collected satellite navigation data to remove redundant information and relays the satellite navigation data to the server 116. The server 116 may also concentrate the collected satellite navigation data and decodes the satellite navigation data, and distributes the decoded data in response to requests. Each of the network elements maintains a set of status variables associated with its respective processing of satellite navigation data.

In one embodiment, the status variables maintained by each network element relate to the integrity of the satellite navigation data, as well as the integrity of the respective network element. For example, status variables related to the integrity of the satellite navigation data include variables associated with: the number of satellites represented by the satellite navigation data; ephemeris data (e.g., time-of-ephemeris (TOE), time-of-week (TOW) values); almanac data; atmospheric correction data; clock correction data (e.g., UTC values); satellite health, and like type satellite navigation data parameters known in the art. Status variables related to the integrity of a network element include variables associated with; the link status to other network element(s) with which the network element communicates; status of various devices employed by the network element (e.g., GPS receivers, processors, disk drives, and the like); status of software processes being executed by the network element; and the like.

Each of the management agents 704 monitors the states of the status variables maintained by its respective network element. Each of the management agents 704 is configured to compare the states of the status variables maintained by its respective network element to thresholds and generate alarms and notifications if the state of any status variable exceeds a threshold. Each of the management agents 704 may monitor each of the status variables in accordance with various polling intervals. The alarms and notifications are sent to the network management system 702, where they may be displayed to a network manager via the GUI interface 706 and/or the web interface 708. In addition, the network management system 702 may forward information related to the alarms and notifications to a remote terminal 710 via a communication network 712. For example, the network management system 702 may send e-mail messages to a network manager, which may be read using various devices, such as a computer, personal digital assistant (PDA), cellular telephone, and the like. The network management system 702 may send short message service (SMS) text messages to a network manager, which may be read using similar type devices.

For example, the management agent 704 in the hub 108 may monitor the state of a status variable associated with TOE data. A threshold value for TOE data may be set that dictates an acceptable age for a TOE value of a satellite navigation data stream. Any TOE value that exceeds the threshold age is deemed to be too old. If the TOE of one or more satellite navigation data streams exceeds a threshold value, the management agent 704 in the hub 108 generates an alarm, which is sent to the network management system 702. The network management system 702 displays the TOE alarm and/or forwards information related to the TOE alarm to a remote terminal. In another example, the management agent 704 in the server 116 may monitor the state of a status variable associated with a disk drive that is used to cache satellite navigation data. A threshold value for disk drive may be set that dictates an acceptable amount of free storage space. If the threshold is exceeded, the disk drive is deemed to have low disk space and the management agent 704 in the server 116 generates an alarm, which is sent to the network management system 702. The network management system 702 displays the low disk space alarm and/or forwards information related to the low disk space alarm to a remote terminal.

Each of the management agents 704 is further configured to receive request messages from the network management system 702 and send reply messages to the network management system 702. For example, the network management system 702 may request the state of a given variable maintained by a network element. The management agent 704 for the network element then responds to the network management system 702 with the current state of the variable. In another example, the network management system 702 may set a value of a threshold for a given variable maintained by a network element. The management agent 704 for the network element then acknowledges the change in the threshold value.

In one embodiment, the satellite distribution system 700 may be managed in accordance with the simple network management protocol (SNMP). The network management system 702 exchanges information with each management agent 704 using a small set of commands. Notably, the network management system 702 may issue a SET command to set a value of a status variable or set a value of a threshold associated with a status variable. The network management system 702 may issue a GET command to retrieve a value of a status variable. Each management agent 704 may issue a TRAP message to spontaneously inform the network management system 702 of an important event (e.g., an alarm).

Each management agent 704, as well as the network management system 702, maintains a management information base (MIB) containing the managed status variables. A numeric tag or object identifier (OID) is used to distinguish each status variable uniquely in the MIB and in SNMP messages. The SNMP protocol is well known in the art.

Figure 8:
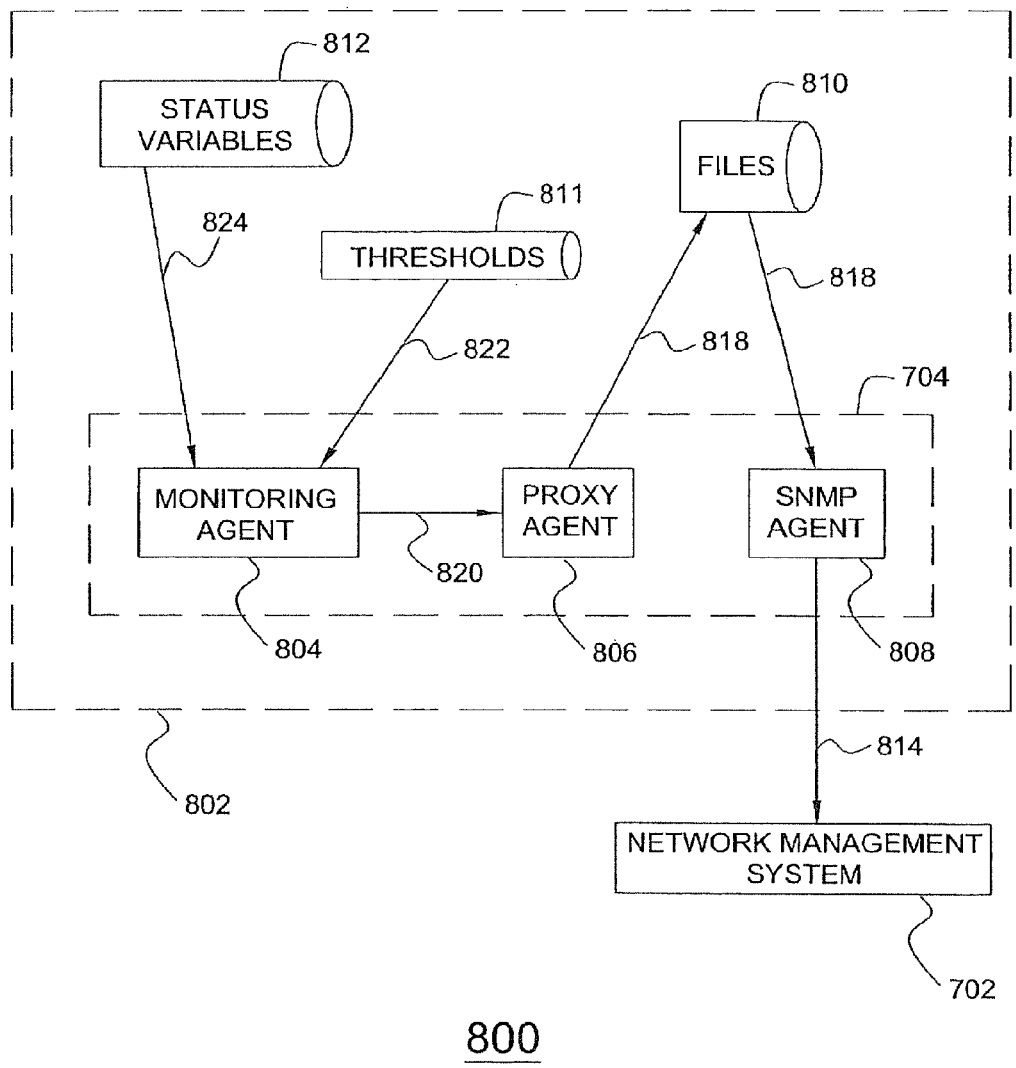
FIG. 8 is a data flow diagram depicting an exemplary embodiment of a method for managing a network element in the satellite navigation data distribution system of FIG. 7 in accordance with the invention.

FIG. 8 is a data flow diagram depicting an exemplary embodiment of a method 800 for managing a network element 802 in the satellite navigation data distribution system 700 in accordance with the invention. In the present embodiment, the management agent 704 of the network element 802 comprises a monitoring agent 804, a proxy agent 806, and an SNMP agent 808. For example, the network element 802 may comprise a computer 600 of FIG. 6, and the management agent 704 may be implemented using software stored in the memory 603. Those skilled in the art will appreciate that the management agent 704 may also be implemented as hardware or a combination of hardware and software.

The monitoring agent 804 performs the actual monitoring of status variables in a storage location 812 and the generation of alarms in accordance with established thresholds in a storage location 811. The storage locations 812 and 822 may be in the memory 603 of the computer 600. The monitoring agent 804 periodically determines state data 824 for the status variables in the storage location 812 in accordance with polling intervals. Notably, the monitoring agent 804 may determine the state of individual status variables using different polling intervals. The monitoring agent 804 compares the state data with threshold data 822 obtained from the storage location 811. If the state of any status variable exceeds its respective threshold value, the monitoring agent 804 generates an alarm. In response to one or more alarms, the monitoring agent 804 sends alarm data 820 to the proxy agent 806.

The proxy agent 806 writes a TRAP message 818 having the alarm data 820 to a file in a storage location 810. The storage location 810 may be in the memory 603 of the computer 600. The SNMP agent 808 reads the TRAP message 818 from a file in the storage location 810. The SNMP agent 808 sends SNMP message data 814 having the TRAP message 818 to the network management system 702. In this manner, an alarm generated at the network element 802 is reported to the network management system.

Figure 9:
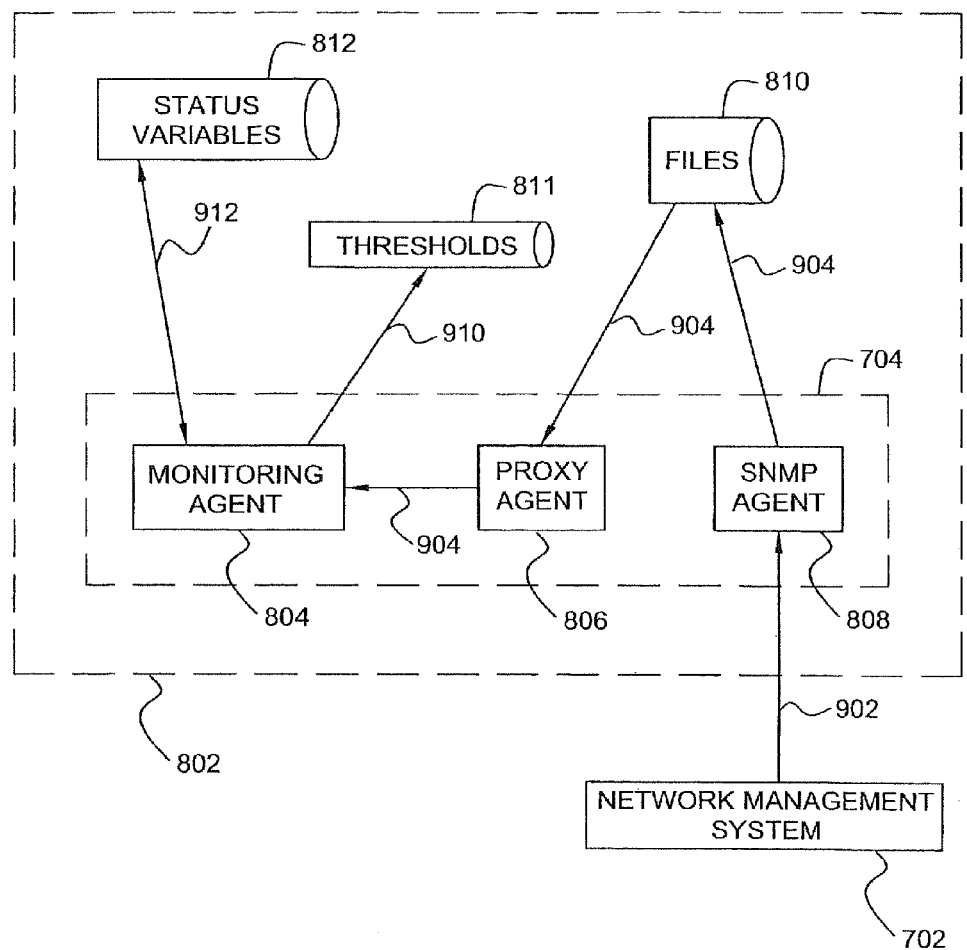
FIG. 9 is a data flow diagram depicting another exemplary embodiment of a method for managing a network element in the satellite navigation data distribution system of FIG. 7 in accordance with the invention.

FIG. 9 is a data flow diagram depicting another exemplary embodiment of a method 900 for managing the network element 802 in accordance with the invention. The network management system 702 sends SNMP request data 902 to the SNMP agent 808. The SNMP request data 902 may comprise a GET or a SET message. The SNMP agent 808 writes a request message 904 to a file in the storage location 810. The proxy agent 806 reads the request message 904 from a file in the storage location 810. The proxy agent 806 forwards the request message 904 to the monitoring agent 804. The monitoring agent 804 processes the request message 904 in accordance with the type of message. For example, if the request message 904 is requesting state data for one or more status variables, the monitoring agent 804 reads state data 912 from the storage location 812. If the request message 904 is requesting a change to a threshold, the monitoring agent 804 writes threshold data 910 to the storage location 811. The monitoring agent 804 may then respond to the network management system 702 in the form of an acknowledgment message. The acknowledgment message may be sent to the network management system 702 in a similar manner as described above in the method 800 for an alarm message.

Although the methods and apparatus of the invention have been described with reference to GPS satellites, it will be appreciated that the teachings are equally applicable to positioning systems that utilize pseudolites or a combination of satellites and pseudolites. Pseudolites are ground-based transmitters that broadcast a PN code (similar to the GPS signal) that may be modulated on an L-band carrier signal, generally synchronized with GPS time. The term "satellite", as used herein, is intended to include pseudolites or equivalents of pseudolites, and the term "GPS signals", as used herein, is intended to include GPS-like signals from pseudolites or equivalents of pseudolites.

Moreover, in the preceding discussion, the invention has been described with reference to application upon the United States Global Positioning System (GPS). It should be evident, however, that these methods are equally applicable to similar satellite systems, and in particular, the Russian Glonass system and the European Galileo system. The term "GPS" used herein includes such alternative satellite positioning systems, including the Russian Glonass system and the European Galileo system.

While the foregoing is directed to embodiments of the present invention, other and further embodiments of the invention may be devised without departing from the basic scope thereof, and the scope thereof is determined by the claims that follow.

The invention claimed is:

1. A network element in a satellite navigation data distribution system, comprising:
   a memory configured to maintain a status variable associated with satellite navigation data; and
   a management agent configured to:
      monitor a state of said status variable,
      compare said state of said status variable to a threshold,
      selectively generate an alarm message in response to a comparison of said state of said status variable to said threshold,
      communicate with a network management system to exchange information related to said state of said status variable,
      receive a request message from said network management system, and update said threshold based on said received message.

2. The network element of claim 1, wherein said status variable comprises at least one of:
   a variable associated with a number of satellites represented by said satellite navigation data;
   a variable associated with ephemeris data in said satellite navigation data;
   a variable associated with almanac data in said satellite navigation data;
   a variable associated with atmospheric correction data in said satellite navigation data; or
   a variable associated with clock correction data in said satellite navigation data.

3. The network element of claim 1, wherein said management agent is configured to communicate using a simple network management protocol (SNMP).

4. The network of claim 3, wherein said management agent comprises:
   a monitoring agent configured to compare said state of said status variable to said threshold and to selectively generate said alarm message in response to said comparison;
   an SNMP agent configured to interface with said network management system; and
   a proxy agent configured to provide an interface between said SNMP agent and said monitoring agent.

5. A method of managing a network element in a satellite navigation data distribution system, comprising:
   maintaining a status variable at said network element in response to satellite navigation data processed by said network element;
   monitoring a state of said status variable;
   comparing said state of said status variable with a threshold;
   generating an alarm message in response to said comparison;
   communicating related to said state of said status variable between said network element and a network management system;
   receiving request message from said network management system, and
   updating said threshold based on said received message.

6. The method of claim 5, wherein said communicating comprises:
   sending reply messages to said network management system in response to said request message.

7. The method of claim 5, wherein said communicating comprises:
   sending said alarm message to said network management system.

8. The method of claim 5, wherein said status variable comprises at least one of:
   a variable associated with a number of satellites represented by said satellite navigation data;
   a variable associated with ephemeris data in said satellite navigation data;
   a variable associated with almanac data in said satellite navigation data;
   a variable associated with atmospheric correction data in said satellite navigation data; and
   one a variable associated with clock correction data in said satellite navigation data.

9. The method of claim 5, wherein said information is communicated using a simple network management protocol (SNMP).

10. A system for distributing satellite navigation data, comprising:
    a plurality of reference stations configured to process satellite signals to obtain the satellite navigation data;
    a server configured to obtain said satellite navigation data and maintain a first status variable, said server including a first management agent configured to:
       monitor a state of said first status variable,
       compare said state of said first status variable to a threshold,
       selectively generate an alarm message in response to a comparison of said state of said first status variable to said threshold,
       receive a request message from a network management system, and
       update said threshold based on said received message; and
    said network management system in communication with said first management agent for exchanging a first message associated with said state of said first status variable.

11. The system of claim 10, wherein each reference station of said plurality of reference stations comprises:
    a second management agent configured to monitor a state of a second status variable maintained by said reference station,
    wherein said network management system is in communication with said second management agent for exchanging a second message associated with said state of said second status variable.

12. The system of claim 10, further comprising:
a hub configured to provide said satellite navigation data from said plurality of reference stations to said server and to maintain a third status variable, said hub including a third management agent configured to monitor a state of said third status variable,
wherein said network management system is in communication with said third management agent for exchanging third message associated with said state of said third status variables.

13. The system of claim 10, wherein said first status variable comprises at least one of:
a variable associated with a number of satellites represented by said satellite navigation data;
a variable associated with ephemeris data in said satellite navigation data;
a variable associated with almanac data in said satellite navigation data;
a variable associated with atmospheric correction data in said satellite navigation data; and
a variable associated with clock correction data in said satellite navigation data.

14. The system of claim 10, wherein said network management system is configured to exchange said first message associated with said state of said first status variable using a simple network management protocol (SNMP).

15. The system of claim 14, wherein said first management agent comprises:
a monitoring agent configured to compare said state of said first status variable to said threshold and to selectively generate said alarm message;
an SNMP agent configured to interface with said network management system; and
a proxy agent configured to provide an interface between said SNMP agent and said monitoring agent.

16. An apparatus for managing a network element in a satellite navigation data distribution system, comprising:
means for maintaining a status variable at said network element in response to satellite navigation data processed by said network element;
means for monitoring a state of said status variable;
means for comparing said state of said status variable with a threshold;
means for generating an alarm message in response to a comparison of said state of said status variable with said threshold;
means for communicating information related to said state of said status variable between said network element and a network management system;
means for receiving a request message from said network management system; and
means for updating said threshold based on said received message.

17. The apparatus of claim 16, wherein said means for communicating comprises:
means for sending a reply message to said network management system in response to said request message.

18. The apparatus of claim 16, wherein said means for communicating comprises:
means for sending said alarm message to said network management system.

* * * * *

UNITED STATES PATENT AND TRADEMARK OFFICE
CERTIFICATE OF CORRECTION

PATENT NO. : 8,738,290 B2
APPLICATION NO. : 12/760226
DATED : May 27, 2014
INVENTOR(S) : Abraham et al.

Page 1 of 1

It is certified that error appears in the above-identified patent and that said Letters Patent is hereby corrected as shown below:

Title Page 2, Item (56), please insert --U.S. Patent No. 7,053,824 B2 (05-2006) to Abraham--.

In the Claims:

Column 10, line 9, please replace "communicating related" with --communicating information related--.

Column 10, line 33, please replace "one a variable" with --a variable--.

Signed and Sealed this
Twenty-sixth Day of August, 2014

Michelle K. Lee
*Deputy Director of the United States Patent and Trademark Office*